(12) United States Patent
Schultz

(10) Patent No.: US 11,372,245 B2
(45) Date of Patent: Jun. 28, 2022

(54) MULTI-CHANNEL WAVEGUIDE WITH REDUCED CROSSTALK HAVING OFFSET INPUT GRATINGS

(71) Applicant: Vuzix Corporation, West Henrietta, NY (US)

(72) Inventor: Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 0 days.

(21) Appl. No.: 16/753,528

(22) PCT Filed: Oct. 6, 2018

(86) PCT No.: PCT/US2018/054778
§ 371 (c)(1),
(2) Date: Apr. 3, 2020

(87) PCT Pub. No.: WO2019/071244
PCT Pub. Date: Apr. 11, 2019

(65) Prior Publication Data
US 2020/0319461 A1 Oct. 8, 2020

Related U.S. Application Data

(60) Provisional application No. 62/568,958, filed on Oct. 6, 2017.

(51) Int. Cl.
*G02B 27/01* (2006.01)
*F21V 8/00* (2006.01)

(52) U.S. Cl.
CPC ....... *G02B 27/0172* (2013.01); *G02B 6/0016* (2013.01); *G02B 6/0038* (2013.01); *G02B 6/0076* (2013.01)

(58) Field of Classification Search
CPC .............. G02B 27/0172; G02B 6/0016; G02B 6/0038; G02B 6/0076; G02B 6/0018
See application file for complete search history.

(56) References Cited

U.S. PATENT DOCUMENTS

| | | | |
|---|---|---|---|
| 10,634,925 B2* | 4/2020 | Grey | G02B 27/1086 |
| 10,698,215 B2* | 6/2020 | Welch | G02B 6/0076 |
| 10,747,001 B2* | 8/2020 | Schultz | G02B 27/0172 |
| 2004/0233534 A1* | 11/2004 | Nakanishi | G11B 7/123 |
| | | | 359/572 |

(Continued)

OTHER PUBLICATIONS

European Patent Office, Extended European Search Report in European patent application No. 18863861.3, dated Apr. 12, 2021.

*Primary Examiner* — Andrew Jordan
(74) *Attorney, Agent, or Firm* — Harter Secrest & Emery LLP; Thomas B. Ryan; Jacob D. Merrill, Esq.

(57) ABSTRACT

A waveguide apparatus for conveying a virtual image has first and second parallel planar surfaces. A first in-coupling diffractive optic on the first planar surface directs a first subset of image-bearing light beams into the waveguide and a second in-coupling diffractive optic on second planar surface directs a second subset of the image-bearing light beams into the waveguide. The first and second in-coupling diffractive optics are offset with respect to each other along the first and second parallel planar surfaces to independently direct the respective first and second subsets of the image-bearing light beams into the waveguide.

16 Claims, 3 Drawing Sheets

(56) References Cited

U.S. PATENT DOCUMENTS

| | | | |
|---|---|---|---|
| 2017/0276948 A1* | 9/2017 | Welch | G02B 27/0172 |
| 2018/0003994 A1* | 1/2018 | Grey | G02B 27/1086 |
| 2019/0011708 A1* | 1/2019 | Schultz | G02B 27/0172 |
| 2020/0209630 A1* | 7/2020 | Schultz | G02B 6/00 |
| 2020/0278498 A1* | 9/2020 | Schultz | G02B 6/29328 |
| 2020/0278543 A1* | 9/2020 | Schultz | G02B 27/0081 |
| 2020/0278554 A1* | 9/2020 | Schultz | G02B 6/0031 |
| 2020/0319461 A1* | 10/2020 | Schultz | G02B 6/0038 |
| 2020/0319466 A1* | 10/2020 | Welch | G02B 27/0172 |

* cited by examiner

MULTI-CHANNEL WAVEGUIDE WITH REDUCED CROSSTALK HAVING OFFSET INPUT GRATINGS

TECHNICAL FIELD

This invention generally relates to diffractive optics including diffraction gratings and more particularly relates to stacking of diffractive optics on single and multiple planar waveguides.

BACKGROUND OF THE INVENTION

Head-Mounted Displays (HMDs) are being developed for a range of diverse uses, including military, commercial, industrial, fire-fighting, and entertainment applications. For many of these applications, there is value in forming a virtual image that can be visually superimposed over the real-world image that lies in the field of view of the HMD user. Optical imaging light guides convey image-bearing light to a viewer in a narrow space for directing the virtual image to the viewer's pupil and enabling this superposition function.

In conventional imaging light guides, collimated, relatively angularly encoded light beams from an image source are coupled into a planar waveguide by an input coupling such as an in-coupling diffractive optic, which can be mounted or formed on one or more of the surfaces of the planar waveguide and/or buried within the waveguide. Such diffractive optics can be formed as diffraction gratings, holographic optical elements or in other known ways. For example, the diffraction grating can be formed by surface relief. After propagating along the waveguide, the diffracted light can be directed back out of the waveguide by a similar output grating, which can be arranged to provide pupil expansion along one dimension of the virtual image.

Multiple stacked waveguides are used to form multiple light channels to convey different aspects of the image bearing light. Each of the image bearing channels may convey different image information, such as different ranges of angles or wavelengths (colors). Cross-talk between the different channels of the stacked gratings on a single waveguide diminishes the output image quality.

Thus, it can be appreciated that there would be advantages to a stack of diffraction gratings that reduces the cross talk between image bearing channels.

SUMMARY OF THE INVENTION

The present disclosure seeks to advance the art of waveguides, particularly for near eye displays having multiple diffractive optics. Advantageously, embodiments of the present disclosure provide stacked waveguides having multiple diffractive optics arranged on the waveguides to reduce optical cross-talk.

These and other aspects, objects, features and advantages of the present invention will be more clearly understood and appreciated from a review of the following detailed description of the preferred embodiments and appended claims, and by reference to the accompanying drawings.

According to an aspect of the present disclosure, an optical waveguide apparatus for conveying image-bearing light beams includes a waveguide having an input region and an output region and first and second parallel planar surfaces that extend between the input region and the output region. A first in-coupling diffractive optic on first planar surface directs a first subset of image-bearing light beams into the waveguide for propagation from the input region to the output region. A second in-coupling diffractive optic on second planar surface directs a second subset of image-bearing light beams into the waveguide for propagation from the input region to the output region. The first and second in-coupling diffractive optics are offset with respect to each other along the first and second parallel planar surfaces to independently direct the respective first and second subsets of the image-bearing light beams into the waveguide.

The first in-coupling diffractive optic is preferably offset with respect to the second in-coupling diffractive optic to avoid interacting with the second subset of image-bearing light beams, and the second in-coupling diffractive optic is preferably offset with respect to the first in-coupling diffractive optic to avoid interacting with the first subset of image-bearing light beams. The first in-coupling diffractive optic can be operated in a transmissive mode to diffract the first subset of image-bearing light beams through the first planar surface for propagation along the waveguide. The second in-coupling diffractive optic can be operated in a reflective mode to diffract the second subset of image-bearing light beams from the second planar surface for propagation along the waveguide.

The image-bearing beams of the first and second subsets preferably differ in at least one of wavelength band, polarization, and range of angularly related beams. First and second input sets of image-bearing light beams can be directed to different positions along the waveguide in accordance with the offset between the first and second in-coupling diffractive optics. The first input set of image-bearing light beams can encounter the first in-coupling diffractive optic for diffracting the first input set into the waveguide as the first subset of image-bearing light beams, and the second input set of image-bearing light beams can transmit through the first and second planar surfaces of the waveguide before encountering the second in-coupling diffractive optic for diffracting the second input set into the waveguide as the second subset of image bearing light beams. Preferably the image-bearing beams of the first and second input sets differ in at least one of wavelength band, polarization, and range of angularly related beams.

According to another aspect of the disclosure an optical waveguide apparatus includes first and second waveguides, each having first and second parallel planar surfaces on opposite sides of the waveguides. A first in-coupling diffractive optic is located on the first planar surface of the first waveguide, and a second in-coupling diffractive optic is located on the second planar surface of the first waveguide. A third in-coupling diffractive optic is located on the first planar surface of the second waveguide, and a fourth in-coupling diffractive optic is located on the second planar surface of the second waveguide. The first and second in-coupling diffractive optics are offset with respect to each other along the first and second parallel planar surfaces of the first waveguide, and the third and fourth in-coupling diffractive optics are offset with respect to each other along the first and second parallel planar surfaces of the second waveguide.

The first and third in-coupling diffractive optics can be aligned with each other along a normal to the first and second parallel planar surfaces of the first and second waveguides. Similarly, the second and fourth in-coupling diffractive optics can be aligned with each other along a normal to the first and second parallel planar surfaces of the first and second waveguides. First and second input sets of image-bearing light beams can be directed to different positions along the waveguide in accordance with the offset between the first and second in-coupling diffractive optics.

The first in-coupling diffractive optic preferably splits the first input set of image-bearing beams into a first subset of image-bearing beams that propagates along the first waveguide and a second subset of image-bearing beams that is further diffracted by the third in-coupling diffractive optic for propagation along the second waveguide. The second in-coupling diffractive optic preferably splits the second input set of image-bearing beams into a third subset of image-bearing beams that propagates along the first waveguide and a fourth subset of image-bearing beams that is further diffracted by the fourth in-coupling diffractive optic for propagation along the second waveguide.

The image-bearing beams of the first and second subsets can differ in wavelength band, and the image bearing light beams of the third and fourth subsets can differ in angular range.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings, wherein:

DETAILED DESCRIPTION OF THE INVENTION

The present description is directed to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" and "left" and "right" refer to orientations apparent from the drawings and do not necessarily denote any particular orientation during use.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S. A component for optical coupling allows light energy to be input to, or output from, an optical apparatus. Typical applications for image conveying waveguides are head-mounted monocular or binocular display systems.

Figure 1:
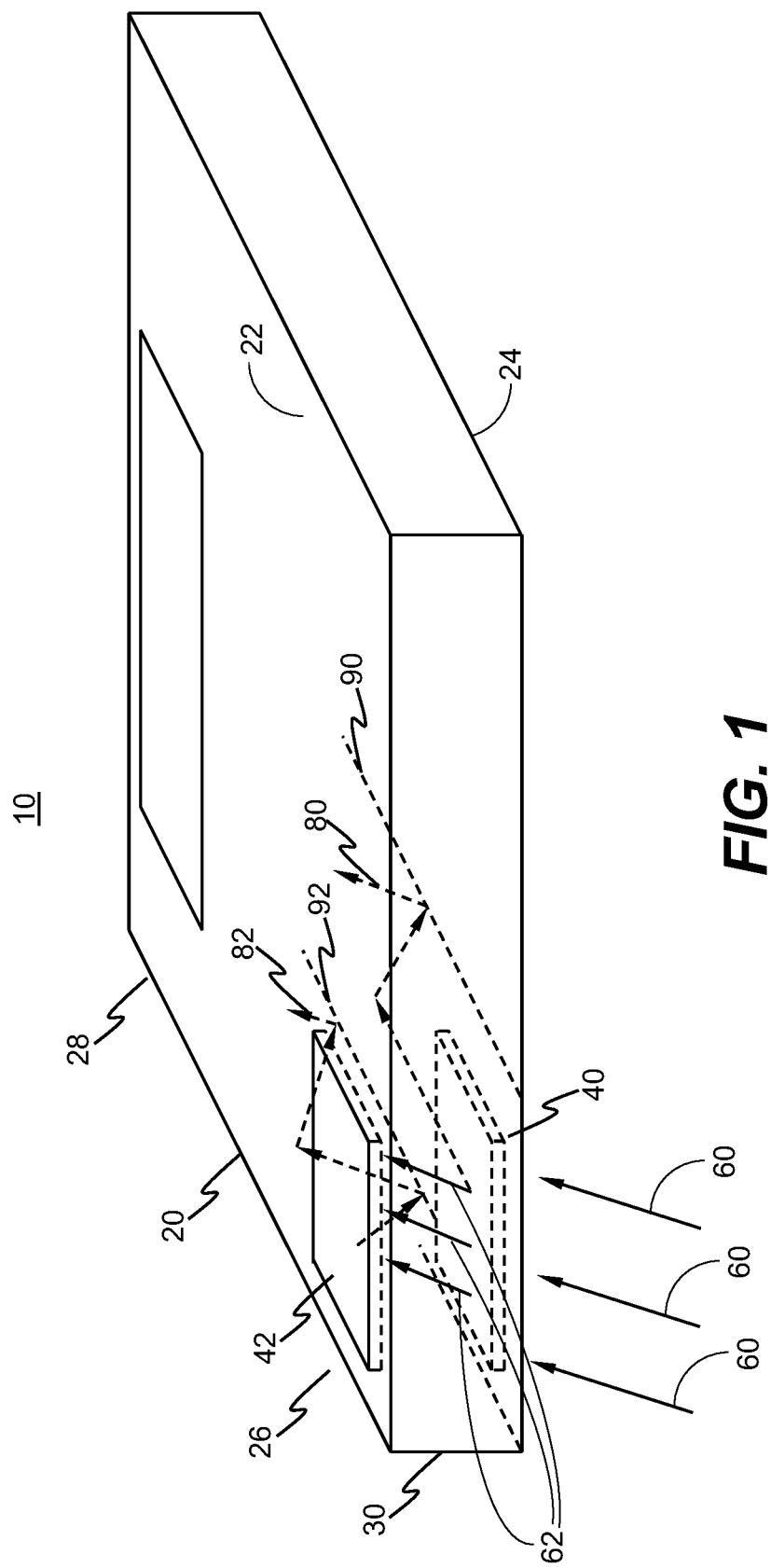
FIG. 1 is a perspective view that shows a waveguide with diffractive optics in the form of diffraction gratings.

FIG. 1 is a perspective view of a waveguide assembly 10 comprising a planar waveguide 20 composed of a transparent medium such as plastic or glass. The depicted waveguide 20 has a top planar surface 22 and a bottom planar surface 24 that extend in parallel and are separated by a thickness 30 of the waveguide 20. Within an input region 26 of the waveguide, an in-coupling diffractive optic 40 is disposed on the bottom planar surface 24 for diffracting first and second subsets 80 and 82 of externally incident image-bearing light beams 60 into the waveguide 20. The first subset 80 is diffracted through a non-zero diffraction order for propagation along the waveguide 20 from the input region 26 to an output region 28 by total internal reflection from the top and bottom planar surfaces 22 and 24. Reference line 90 is depicted on the bottom planar surface 24 in FIG. 1 for ease of visualizing the propagation of the first subset 80 of the image-bearing light beams along the waveguide 20.

The second subset 82 of the image-bearing light beams, which is diffracted through the zero order of the in-coupling diffractive optic 40, transmits through the thickness 30 of the waveguide 20 as shown by beams 62 to a position of internal incidence with an in-coupling diffractive optic 42 disposed on the top planar surface 22 of waveguide 20. Operating in a reflective mode, the in-coupling diffractive optic 42 diffracts the second subset 82 of the image-bearing light beams 60 through a non-zero diffraction order for propagation along the waveguide 20 from the input region 26 to an output region 28 by total internal reflection from the top and bottom planar surfaces 22 and 24. Reference line 92 is depicted on the bottom planar surface 24 in FIG. 1 for ease of visualizing the propagation of the second subset 82 of the image bearing light beams along the waveguide 20.

The two subsets 80 and 82 of the image-bearing light beams can convey different aspects of a desired image, such as different ranges of angularly encoded beams corresponding to different regions of the image or different bands of wavelengths corresponding to different colors or color ranges of the image. While the diffracted subsets 80 and 82 are depicted as single rays, each of these rays is representative of various bundles of rays corresponding to the angular encoding of the image-bearing beams within each subset. As respective conveyors of information regarding the desired image, the subsets can also be referred to as different optical channels.

The combination of in-coupling diffractive optics 40 and 42 can be used to separate image-bearing beams of the external applied polychromatic input image-bearing beams 60 into different wavelength bands. For example, the subset 80 of the image-bearing beams can comprise wavelengths in a blue wavelength band while the subset 82 of the image-bearing beams can comprise wavelengths in a red wavelength band. The blue wavelength band can consist of wavelengths ranging from 450 to 500 nanometers, from 450 to 495 nanometers, or from 460 to 480 nanometers. The red wavelength band can consist of wavelengths ranging from 550 to 700 nanometers, from 620 to 750 nanometers, or from 650 to 700 nanometers. Separation of the polychromatic input image-bearing beams into wavelength bands directs the separated subsets 80 and 82 into different optical channels. Such wavelength distinguishable optical channels can be referred to as color channels. It is to be understood that labeling of the channels as "red" and/or "blue" is used here only to provide a name to a signal channel for ease of reference and is not necessarily an indication of the different wavelength contents of the channel.

The combination of in-coupling diffractive optics 40 and 42 can also be used to separate the input image-bearing beams 60 into two different polarizations. The subsets 80 and 82 having different polarizations can be referred to as different polarization channels. Each polarization channel can be arranged to convey information regarding a different image or a different portion of an image. For enhancing their separation, the subset 80 of the image-bearing beams can be propagated along a different portion of waveguide 20 than subset 82 of the image-bearing beams.

As depicted in FIG. 1, second in-coupling diffractive optic 42 is substantially located over the in-coupling diffractive optic 40 at the input region 26 of waveguide 20. That is, the first and second in-coupling diffractive optics 40 and 42 are aligned with each other (i.e., not offset) on the opposite sides of the waveguide 20. Due to such proximity, crosstalk may occur within the color and/or polarization channels. As is used in this disclosure, "crosstalk" is any phenomenon by which a signal transmitted in one channel of a signal conveying system creates an undesired effect in another channel. Crosstalk is generally an undesirable effect that diminishes the quality if the output signals of the signal conveying system. For example, if the diffracted subset 80 of the image-bearing beams do not completely clear the in-coupling diffractive optic 42 as they propagate through waveguide 20 then crosstalk between the two channels can occur. Similarly, if the diffracted subset 82 of the image-bearing beams do not completely clear the in-coupling diffractive optic 40 as they propagate through waveguide 20 then crosstalk between the two channels can occur.

Figure 2:
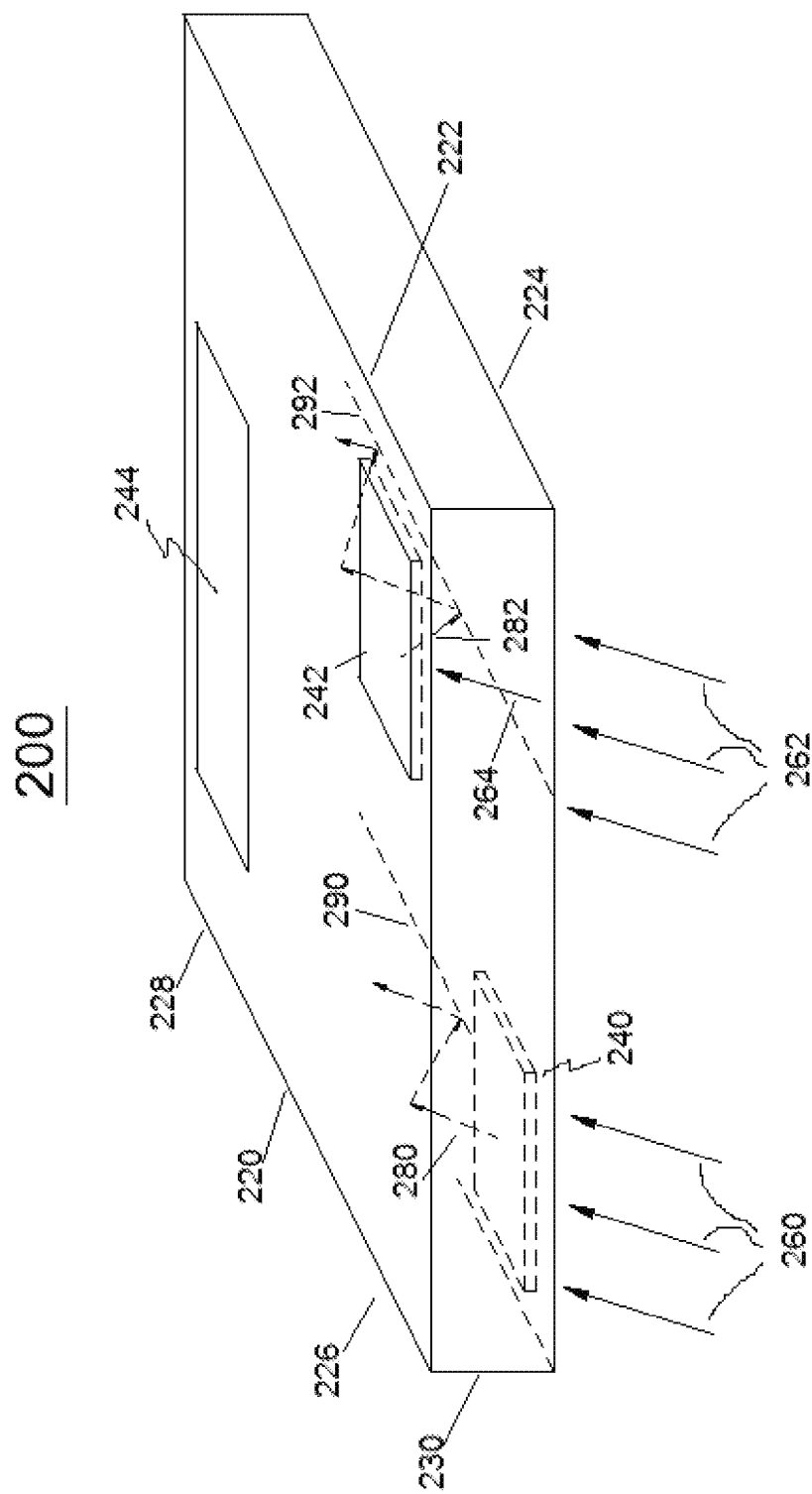
FIG. 2 is a perspective view that shows a waveguide with non-overlapping diffractive optics.

FIG. 2 is a perspective drawing of one embodiment of a waveguide assembly 200 comprising a waveguide 220 having a top planar surface 222, a bottom planar surface 224 that extends parallel to the top planar surface, and a thickness 230 separating the top planar surface 222 from the bottom planar surface 224 on opposite sides of the waveguide 220. The waveguide 220, which is preferably composed of a transparent material such as glass or plastic, has input region 226 and an output region 228. An in-coupling diffractive optic 240 is in the input region 226 of waveguide 220 on the bottom planar surface 224. An in-coupling diffractive optic 242 is in the input region 226 of waveguide 220 on the top planar surface 222. Thus, the two in-coupling diffractive optics are located on opposite sides of the waveguide 220 and are offset from each other along the parallel top and bottom planar surfaces 222 and 224.

Two subsets 260 and 262 of image bearing light beams approach the waveguide 220 in approximate alignment with the respective in-coupling diffractive optics 240 and 242. The two subsets 260 and 262, which together convey information for viewing a desired image particularly in the form of a virtual image, can arise from a common set of image-bearing light beams produced by an image generator or can be produced by two separate image generators. Such image generators can take a variety of known forms such as image generators that produce real virtual images that are converted by focusing optics into sets of angularly encoded light beams or laser sources coupled to beam steering devices that directly produce the sets of angularly encoded light beams. A set of such angularly encoded image bearing light beams can be split into the two offset subsets 260 and 262 of the of the image bearing light beams by various mechanisms such as beam splitting or can be generated separately or sequentially for propagation to the waveguide 220 on separate paths.

The subset 260 of the image-bearing light beams encounters the in-coupling diffractive optic 240 and is diffracted through a non-zero diffraction order into the waveguide 220 as the subset 280 of image-bearing light beams for propagation from the input region 226 to the output region 228 by total internal reflections from the top and bottom planar surfaces 222 and 224. An out-coupling optic 244, which can also take the form of a diffractive optic, in the output region 228 directs the subset 280 from the waveguide 220 preferably into an eyebox within which the portion of the generated image conveyed by the subset 280 can be viewed as corresponding portion of a virtual image. Reference line 290 drawn on the bottom planar surface 224 is shown in FIG. 2 to ease visual depiction of the subset 280 propagating along the waveguide 220.

The subset 262 of the image-bearing light beams transmits through the bottom planar surface 224 and through thickness 230 of the waveguide 220 as input image-bearing beams 264 into an encounter with the in-coupling diffractive optic 242. Operating in a reflective rather than transmissive mode, the in-coupling diffractive optic 242 diffracts the input image-bearing beams 264 through a non-zero diffraction order into the waveguide 220 as the subset 282 of image-bearing light beams for propagation from the input region 226 to the output region 228 by total internal reflections from the top and bottom planar surfaces 222 and 224. The subset 282 of image-bearing light beams can encounter same out-coupling optic 244 or a different out-coupling diffractive optic in the output region 228 that directs the subset 282 from the waveguide 220 preferably into the eyebox within which the portion of the generated image conveyed by the subset 282 can also be viewed as corresponding portion of the virtual image. Reference line 292 drawn on the bottom planar surface 224 is shown in FIG. 2 to ease visual depiction of the subset 282 propagating along the waveguide 220. Turning optics, which can also be in the form of diffractive optics, can be positioned along the waveguide for further redirecting the subsets 280 and 282 toward the same out-coupling optic 244 or a different out-coupling diffractive optic.

The two subsets 280 and 282 of image-bearing beams can encode different aspects of a common image or differently related images. For example, the subsets 280 and 282 can convey different wavelength bands, different polarizations, or different ranges of angularly encoded beams. The in-coupling diffractive optics 240 and 242 can be separately arranged to more efficiently diffract the respective subsets 280 and 282 in accordance with their intended characteristics. For example, the in-coupling diffractive optic 240 can be designed for optimally diffracting a first wavelength band, a first polarization, or a first range of angularly encoded beams into the waveguide 220, and the in-coupling diffractive optic 242 can be designed for diffracting a second wavelength band, a second polarization, or a second range of angularly encoded beams into the waveguide 220. The subsets 280 and 282 exhibiting such differing characteristics can be regarded as different channels.

The subsets 260 and 262 of image-bearing light beams can contain identical subsets of image-bearing light beams that are selectively diffracted into the waveguide 220 in accordance with the respective characteristics of the in-coupling diffractive optics 240 and 242 or the subsets 260 and 262 can themselves be preselected or otherwise distinguished in accordance with the respective characteristics of the in-coupling diffractive optics 240 and 242. For example, the in-coupling diffractive optic 240 can be optimized for diffracting the wavelength band, polarization, or range of angularly encoded beams within the subset 260, and of the in-coupling diffractive optic 242 can be optimized for diffracting the different wavelength band, different polarization, or different range of angularly encoded beams within the subset 262.

In the embodiment depicted in FIG. 2, the in-coupling diffractive optic 242 is positioned on top planar surface 222 such that no portion of the in-coupling diffractive optic 242 overlaps the in-coupling diffractive optic 240 disposed on bottom planar surface 224 as viewed along a normal through both planar surfaces 222 and 224. In this way, crosstalk in the signal carrying channels is reduced.

Positioning the in-coupling diffractive optics 240 and 242 so that they do not overlap one another, or do not significantly overlap one another, as viewed along the surface normal, it is possible to reduce the size of one or both the in-coupling diffractive optics 240 and 242. The in-coupling diffractive optics 240 and 242 preferably relatively offset from one another along their respective planar surfaces 222 and 224 such that the image-bearing beams of the subset 280 diffracted by the in-coupling diffractive optic 240 do not interact with the in-coupling diffractive optic 242, and the image-bearing beams of the subset 282 diffracted by the in-coupling diffractive optic 242 do not interact with the in-coupling diffractive optic 240. The arrangement in which the in-coupling diffractive optics 240 and 242 on opposite sides of the waveguide 220 are also relatively offset along the planar side surfaces 222 and 224 of the waveguide 220 provide for conveying multiple channels within the same waveguide 220 while minimizing crosstalk between the channels.

Figure 3:
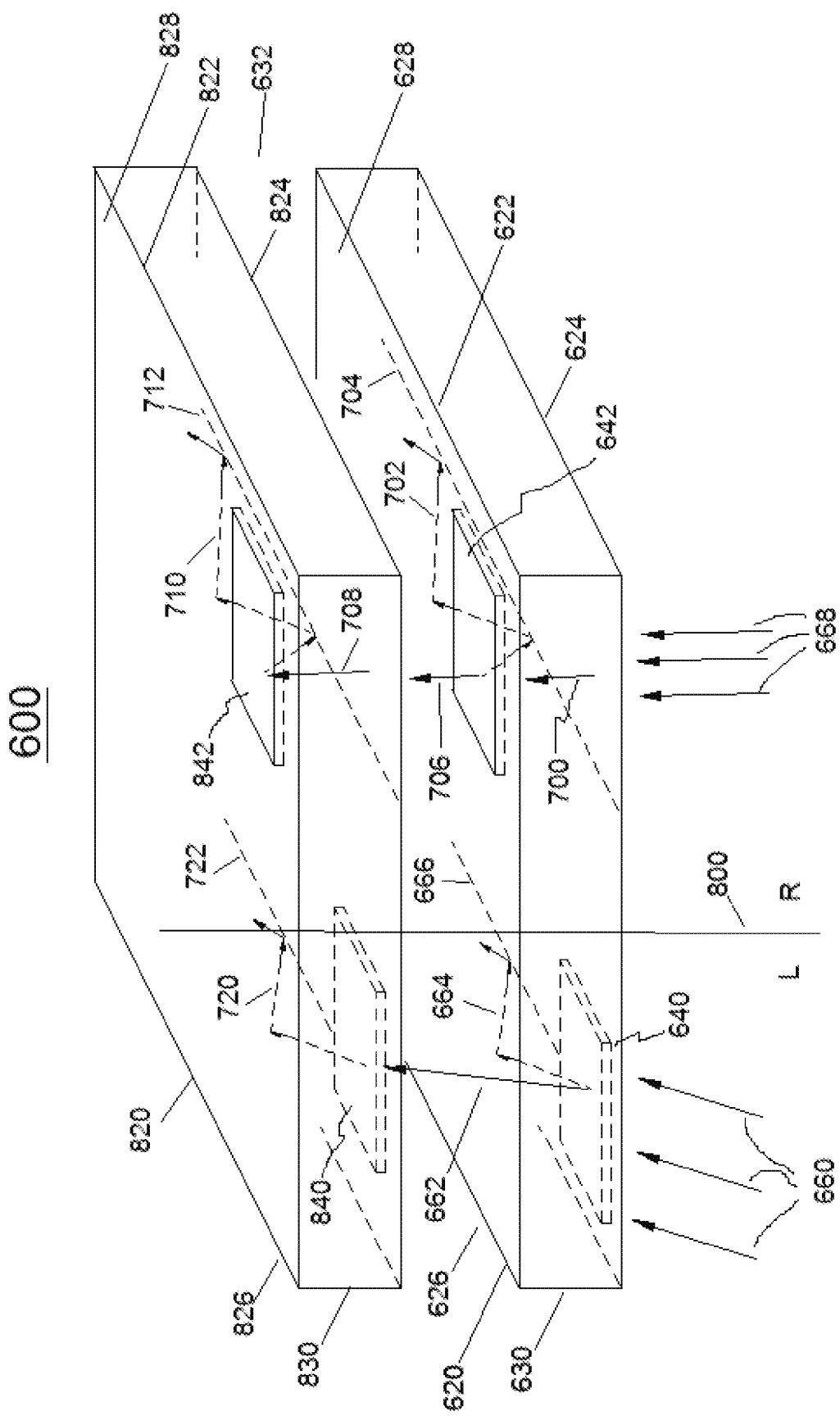
FIG. 3 is a perspective view that shows stacked diffractive optics positioned according to one embodiment of this invention.

FIG. 3 depicts a stacked waveguide assembly 600 comprising two waveguides 620 and 820 separated by gap 632. Both waveguides 620 and 820 are preferably formed of transparent materials such as glass or plastic. The gap 632, which is preferably spatially fixed, can be filled with air or another optically distinguishing medium, or the waveguides 620 and 820 can be selectively coupled together to support their separate and joint operations. Bilateral symmetry reference line 800 depicted in FIG. 3 is provided for visual ease only to distinguish "left" and "right" regions, designated by "L" and "R", of the waveguides 620 and 820.

The waveguide 620 has a left in-coupling diffractive optic 640 disposed on a bottom planar surface 624 and a right in-coupling diffractive optic 642 disposed on a top planar surface 622. The planar surfaces 622 and 624 extend in parallel and are separated by a thickness 630 of the waveguide 620. In-coupling diffractive optics 640 and 642 are further disposed within an input region 626 of waveguide 620. Although not shown, an out-coupling diffractive optic can be positioned in an output region 628 of the waveguide 620 for directing subsets of image-bearing beams to exit the waveguide 620, such as for filling an eyebox.

Similarly, the waveguide 820 has a left in-coupling diffractive optic 840 disposed on bottom planar surface 824 and a right in-coupling diffractive optic 842 disposed on top planar surface 822. The planar surfaces 822 and 824 extend in parallel and are separated by a thickness 830 of the waveguide 820. In-coupling diffractive optics 840 and 842 are further disposed within an input region 826 of waveguide 820. The two left in-coupling diffractive optics 640 and 840 operate in a transmissive mode, and the two right in-coupling diffractive optics 642 and 842 operate in a reflective mode. An out-coupling diffractive optic can be positioned in an output region 828 of the waveguide 820 for directing subsets of image-bearing beams to exit the waveguide 820, such as for filling an eyebox.

A left set 660 of image-bearing beams from an external source as described above is directed to the left in-coupling diffractive optic 640, which diffracts a portion of the left set 660 of image-bearing light beams through a non-zero diffraction order for propagation along waveguide 620 as a left-bottom subset 664 of the image-bearing light beams. Reference line 666 drawn on the bottom planar surface 624 is shown in FIG. 3 to ease visual depiction of the left-bottom subset 664 propagating along the waveguide 620. The diffraction through the non-zero diffraction order orients the left-bottom subset 664 of the image-bearing light beams for encountering the top and bottom planar surfaces 622 and 624 at incidence angles above a critical angle for supporting total internal reflections. Thus, the image-bearing light beams of the left-bottom subset 664 remain within the medium of the waveguide 620 for further propagation from the input region 626 to an output region 628 of the waveguide 620 and do not interact with the left in-coupling diffractive optic 840 of the waveguide 820.

However, another portion of the left set 660 of image-bearing light beams is diffracted by the left in-coupling diffractive optic 640 through a zero diffraction order as intermediate image-bearing beams 662, which pass through the top planar surface 662 of the waveguide 620 at angles of incidence below the critical angle. The intermediate image-bearing beams 662 also pass through the gap 632 into an encounter with the left in-coupling diffractive optic 840 of the waveguide 820. The left in-coupling diffractive optic 840 diffracts the intermediate image-bearing beams 662 through a non-zero diffraction order as a left-top subset 720 of the image-bearing light beams for propagation from the input region 826 to an output region 828 along waveguide 820 by internal reflections from the top and bottom planar surfaces 822 and 824. Reference line 722 drawn on the bottom planar surface 824 is shown to ease visual depiction of the left-top subset 720 propagating along the waveguide 820.

A right set 668 of image-bearing beams from the same external source as the left set 660 or from a different external source is directed into the waveguide 820 through the bottom planar surface 624 as input image-bearing beams 700 that transmit through the thickness 630 of the waveguide 620 into an encounter with the right in-coupling diffractive optic 642. The right in-coupling diffractive optic 642, which is offset from the left in-coupling optic 640 along the parallel top and bottom planar surfaces 622 and 624, diffracts a portion of the input image-bearing light beams 700 through a non-zero diffraction order for propagation along waveguide 820 as a right-bottom subset 702 of the image-bearing light beams. Reference line 704 drawn on the bottom planar surface 624 is shown in FIG. 3 to ease visual depiction of the right-bottom subset 702 propagating along the waveguide 620. The non-zero diffraction order orients the right-bottom subset 702 of the image-bearing light beams for encountering the top and bottom planar surfaces 622 and 624 at incidence angles above a critical angle for supporting total internal reflections. Thus, the image-bearing light beams of the left-bottom subset 702 remain within the medium of the waveguide 620 for further propagation from the input region 626 to an output region 628 of the waveguide 620 and do not interact with the right in-coupling diffractive optic 842 of the waveguide 820.

However, another portion of the input image-bearing beams 700 is diffracted by the right in-coupling diffractive optic 642 through a zero diffraction order as intermediate image-bearing beams 706, which pass through the gap 632 and enter the waveguide 820 through the bottom planar surface 824 as intermediate image-bearing beams 708 at angles of incidence below the critical angle. The intermediate image-bearing beams 708 transmit through the thickness 830 of the waveguide 820 into an encounter with the right in-coupling diffractive optic 842, which diffracts the intermediate image-bearing beams 708 through a non-zero diffraction order as a right-top subset 710 of the image-bearing light beams for propagation from the input region 826 to an output region 828 along waveguide 820 by internal reflections from the top and bottom planar surfaces 822 and 824. Reference line 712 drawn on the bottom planar surface 824 is shown to ease visual depiction of the right-top subset 710 propagating along the waveguide 820.

The left and right sets of image-bearing beams 660 and 668 can have the same or different sources and can convey the same or different information about desired images. The left in-coupling diffractive optic 640 can be arranged to separate the left set 660 of image bearing beams into the intermediate image-bearing beams 662 and the left-bottom subset 664 of image-bearing beams for separately conveying different aspects of a common image or differently related images, such as in the form of different wavelength bands, different polarizations, or different ranges of angularly encoded beams. The left in-coupling diffractive optic 640 provides for propagating the left-bottom subset 664 of image-bearing beams between the input region 626 and the output region 628 of the waveguide 620. The left in-coupling diffractive optic 840 can be arranged to further propagate contents of the intermediate image-bearing beams 662 as the left-top subset 720 of image bearing beams from the input region 826 to the output region 828 of the waveguide 820. Crosstalk is minimized because the left-bottom and left-top subsets 664 and 720 propagate along separate waveguides 620 and 820.

Similarly, the right in-coupling diffractive optic 642 can be arranged to separate the input image-bearing beams 700 as successors of the right set 668 of image-bearing beams into the intermediate image-bearing beams 706 and the right-bottom subset 702 of image-bearing beams for separately conveying different aspects of a common image or differently related images, such as in the form of different wavelength bands, different polarizations, or different ranges of angularly encoded beams. The right in-coupling diffractive optic 642 propagates the right-bottom subset 702 of image-bearing beams between the input region 626 and the output region 628 of the waveguide 620. The right in-coupling diffractive optic 842 can be arranged to further propagate contents of the intermediate image-bearing beams 708 as successors of the intermediate image-bearing beams 706 as the right-top subset 710 of image bearing beams from the input region 826 to the output region 828 of the waveguide 820.

One of the left and right in-coupling diffractive optics 640 and 642 can be arranged for separating different wavelength bands of the image-bearing beams and the other of the left and right in-coupling diffractive optics 640 and 642 can be arranged for separating different angular ranges of the image-bearing beams. Crosstalk is minimized because the right-bottom and right-top subsets 702 and 710 propagate along separate waveguides 620 and 820.

In addition, cross talk is minimized between the left-bottom and right-bottom subsets 664 and 702 because the respective left and right in-coupling diffractive optics 640 and 642 are both located on opposite sides of the waveguide 620 and offset with respect to each other along the respective top and bottom planar surfaces 622 and 624. Cross talk is minimized between the left-top and right-top subsets 720 and 710 because the respective left and right in-coupling diffractive optics 840 and 842 are both located on opposite sides of the waveguide 820 and offset with respect to each other along the respective top and bottom planar surfaces 822 and 824. The subsets 664 and 702 and the subsets 720 and 710 avoid crosstalk because the subset 664 avoids interacting with the in-coupling diffractive optic 642, the subset 702 avoids interacting with the in-coupling diffractive optic 640, the subset 720 avoids interacting with the in-coupling diffractive optic 842, and the subset 710 avoids interacting with the in-coupling diffractive optic 840. The reduction in crosstalk provides better quality output signals. Higher quality output signals allow the size of the in-coupling diffractive optics to be reduced while maintaining an acceptable output signal quality.

The invention claimed is:

1. An optical waveguide apparatus for conveying image-bearing light beams, comprising:
    a waveguide having an input region and an output region, and having first and second parallel planar surfaces that extend between the input region and the output region;
    a first in-coupling diffractive optic at the first planar surface operable to direct a first subset of image-bearing light beams into the waveguide to propagate as a first subset of in-coupled image-bearing light beams from the input region to the output region; and
    a second in-coupling diffractive optic at the second planar surface operable to direct a second subset of image-bearing light beams into the waveguide to propagate as a second subset of in-coupled image-bearing light beams from the input region to the output region;
    wherein the first and second in-coupling diffractive optics are offset with respect to each other along the first and second parallel planar surfaces in a transverse direction to a direction from the input region to the output region.

2. The waveguide apparatus of claim 1, wherein the first in-coupling diffractive optic is operable to avoid interacting with the second subset of in-coupled image-bearing light beams and the second in-coupling diffractive optic is operable to avoid interacting with the first subset of in-coupled image-bearing light beams.

3. The waveguide apparatus of claim 1, wherein the first in-coupling diffractive optic operating in a transmissive mode diffracts the first subset of image-bearing light beams through the first planar surface, wherein the first subset of in-coupled image-bearing light beams is operable to propagate along the waveguide, and the second in-coupling diffractive optic operating in a reflective mode diffracts the second subset of image-bearing light beams from the second planar surface, wherein the second subset of in-coupled image-bearing light beams is operable to propagate along the waveguide.

4. The waveguide apparatus of claim 3, wherein the second subset of image-bearing light beams transmit through the first planar surface before reaching the second in-coupling diffractive optic.

5. The waveguide apparatus of claim 3, wherein the first and second subsets of image-bearing light beams differ in at least one of wavelength band, polarization, and range of angularly related beams.

6. The waveguide apparatus of claim 1, wherein the first and second subsets of image-bearing light beams are directed to different positions along the waveguide in accordance with the offset between the first and second in-coupling diffractive optics.

7. The waveguide apparatus of claim 6, wherein
    the first subset of image-bearing light beams encounters the first in-coupling diffractive optic, wherein the first in-coupling diffractive optic is operable to diffract the first subset of image-bearing light beams into the waveguide as the first subset of in-coupled image-bearing light beams, and
    the second subset of image-bearing light beams transmits through the first planar surface of the waveguide before encountering the second in-coupling diffractive optic, wherein the second in-coupling diffractive optic is operable to diffract the second subset of image-bearing light beams into the waveguide as the second subset of in-coupled image bearing light beams.

8. The waveguide apparatus of claim 7, wherein the first and second subsets of image-bearing light beams differ in at least one of wavelength band, polarization, and range of angularly related beams.

9. An optical waveguide apparatus comprising:
a first waveguide and a second waveguide, each having a first parallel planar surface and a second parallel planar surface on opposite sides of the waveguides;
a first in-coupling diffractive optic at the first planar surface of the first waveguide and a second in-coupling diffractive optic at the second planar surface of the first waveguide;
a third in-coupling diffractive optic at the first planar surface of the second waveguide and a fourth in-coupling diffractive optic at the second planar surface of the second waveguide;
the first and second in-coupling diffractive optics being offset with respect to each other along the first and second parallel planar surfaces of the first waveguide; and
the third and fourth in-coupling diffractive optics being offset with respect to each other along the first and second parallel planar surfaces of the second waveguide.

10. The waveguide apparatus of claim 9, wherein the first in-coupling diffractive optic and the third in-coupling diffractive optic are aligned with each other along a normal to the first parallel planar surface and the second parallel planar surface of the first waveguide and the second waveguide.

11. The waveguide apparatus of claim 10, wherein the second in-coupling diffractive optic and the fourth in-coupling diffractive optic are aligned with each other along a normal to the first parallel planar surface and the second parallel planar surface of the first waveguide and the second waveguide.

12. The waveguide apparatus of claim 9, wherein the first input set of image-bearing light beams and the second input set of image-bearing light beams are directed to different positions along the waveguide in accordance with the offset between the first in-coupling diffractive optic and the second in-coupling diffractive optic.

13. The waveguide apparatus of claim 12, wherein the first in-coupling diffractive optic splits the first input set of image-bearing light beams into a first subset of image-bearing light beams operable to propagates along the first waveguide and a second subset of image-bearing light beams operable to be diffracted by the third in-coupling diffractive optic for propagation along the second waveguide.

14. The waveguide apparatus of claim 13, wherein the second in-coupling diffractive optic splits the second input set of image-bearing light beams into a third subset of image-bearing light beams operable to propagates along the first waveguide and a fourth subset of image-bearing light beams operable to be diffracted by the fourth in-coupling diffractive optic for propagation along the second waveguide.

15. The waveguide apparatus of claim 13, wherein the first and second subsets of image-bearing light beams differ in wavelength band.

16. The waveguide apparatus of claim 14, wherein the third and fourth subsets of image bearing light beams differ in angular range.

* * * * *